US011879220B1

(12) United States Patent
Afzal et al.

(10) Patent No.: US 11,879,220 B1
(45) Date of Patent: Jan. 23, 2024

(54) REGENERATIVE SPEED BUMP

(71) Applicant: Prince Mohammad Bin Fahd University, Dhahran (SA)

(72) Inventors: Abdul Aziz Afzal, Dhahran (SA); Aalim Motasim Mustafa, Dhahran (SA); Muhammad Azhar Ali Khan, Dhahran (SA); Mohammed Al-Sabti, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/474,780

(22) Filed: Sep. 26, 2023

(51) Int. Cl.
*E01F 9/529* (2016.01)
*H02K 7/18* (2006.01)

(52) U.S. Cl.
CPC .......... *E01F 9/529* (2016.02); *H02K 7/1807* (2013.01)

(58) Field of Classification Search
None
See application file for complete search history.

(56) References Cited

U.S. PATENT DOCUMENTS

| | | | | |
|---|---|---|---|---|
| 1,916,873 | A * | 7/1933 | Wiggins | F03G 7/08 290/1 R |
| 8,754,539 | B2 * | 6/2014 | Black | F04B 43/1261 290/1 R |
| 10,745,870 | B2 * | 8/2020 | Xiang | F16H 31/001 |

FOREIGN PATENT DOCUMENTS

| | | | | |
|---|---|---|---|---|
| CN | 107246364 | A * | 10/2017 | E01F 9/529 |
| CN | 108412715 | A * | 8/2018 | E01F 9/529 |
| CN | 109555032 | A * | 4/2019 | |
| CN | 110863445 | A | 3/2020 | |
| CN | 111749153 | A | 10/2020 | |
| CN | 111794925 | A | 10/2020 | |
| CN | 112030801 | A * | 12/2020 | |
| CN | 112411409 | A * | 2/2021 | |
| CN | 212958974 | U | 4/2021 | |
| CN | 112983771 | A * | 6/2021 | |
| CN | 214660664 | U | 11/2021 | |
| IE | 87272 | B1 | 11/2021 | |
| KR | 102003832 | B1 * | 7/2019 | |

OTHER PUBLICATIONS

Kolhe et al.; Electric Power Generation System from Speed Breaker by using Rack and Pinion Mechanism; International Journal of Current Engineering and Technology, vol. 7, No. 3; Jun. 18, 2017; 8 Pages.

* cited by examiner

*Primary Examiner* — Thomas B Will
*Assistant Examiner* — Katherine J Chu
(74) *Attorney, Agent, or Firm* — Oblon, McClelland, Maier & Neustadt, L.L.P.

(57) ABSTRACT

A regenerative speed bump includes a flat base portion and a sloped cover portion which together form a cavity to house a regenerative energy mechanism therein. The sloped cover portion is flexible and configured to deflect downward upon application of force. The regenerative energy mechanism includes a main gear having an axis of rotation and an inner ring of ratchets, a plunger positioned along the axis of rotation and rotates the main gear by motion thereof along the axis of rotation, and a pawl configured to allow the inner ring of ratchets and the main gear to rotate in only one direction. The plunger is mechanically connected to the sloped cover portion such that the plunger moves down along the axis of rotation when the sloped cover portion deflects downward.

20 Claims, 5 Drawing Sheets

REGENERATIVE SPEED BUMP

TECHNICAL FIELD

The present disclosure is directed to energy regeneration, and more particularly, relates to a regenerative speed bump and a method of energy regeneration using a speed bump.

DESCRIPTION OF RELATED ART

The "background" description provided herein is for the purpose of generally presenting the context of the disclosure. Work of the presently teamed inventors, to the extent it is described in this background section, as well as aspects of the description which may not otherwise qualify as prior art at the time of filing are neither expressly or impliedly admitted as prior art against the present invention.

Generally, speed bumps are implemented on a road to reduce the speed of vehicles near residential areas or constructions sites where high speeds are hazardous for drivers and the surroundings. Multiple designs of regenerative speed bumps have been developed and implemented. The regenerative speed bump works on the principle of converting kinetic energy of the vehicle into electrical energy. Due to low practicality and complexity of the conversion mechanism, conventional regenerative speed bumps are not used for regenerative purposes. Further, conventional designs of regenerative speed bumps use a rack and pinion mechanism which occupies a lot of space and is impractical for use on the road due to its high height.

IE87272B1 discloses a regenerative speed bump including a teethed plunger and gears positioned on two sides of the teethed plunger. This reference discloses a rack and pinion mechanism like any other conventional regenerative speed breakers and occupies a lot of space to accommodate the same on the road.

CN212958974U discloses a regenerative speed breaker system including a double-face rack and two gears on each side.

Similarly, CN111749153A discloses a rack and pinion mechanism which requires a lot space to implement on the road.

Each of the aforementioned patent references suffers from one or more drawbacks hindering their adoption. Accordingly, it is one object of the present disclosure to provide a regenerative speed bump and a method for regenerating energy using the regenerative speed bump which requires less space to implement on the road.

SUMMARY

According to a first aspect of the disclosure, a regenerative speed bump is disclosed. The regenerative speed bump includes a flat base portion and a sloped cover portion. The flat base portion and the sloped cover portion form a cavity enclosed in the regenerative speed bump. The sloped cover portion is flexible and configured to deflect downward upon application of force. The regenerative speed bump further includes a regenerative energy mechanism that is housed in the cavity of the regenerative speed bump and includes a main gear having an axis of rotation and including an inner ring of ratchets. The regenerative energy mechanism further includes a plunger positioned along the axis of rotation and configured to rotate the main gear by motion of the plunger along the axis of rotation. The regenerative energy mechanism further includes a pawl configured to allow the inner ring of ratchets and the main gear to rotate in only one direction. The plunger is mechanically connected to the sloped cover portion such that the plunger moves down along the axis when the sloped cover portion deflects downward.

In some embodiments, the plunger includes a spiral portion in contact with the main gear during the motion of the plunger along the axis of rotation.

In some embodiments, the main gear further includes a central nut in contact with the spiral portion of the plunger during the motion of the plunger along the axis of rotation.

In some embodiments, the central nut includes at least one slot through which the plunger extends.

In some embodiments, the at least one slot is rectangular.

In some embodiments, the plunger is configured to rotate the main gear by a spinning top mechanism.

In some embodiments, the regenerative speed bump further Mendes a generator including at least one gear connected to the main gear so that the generator is configured to generate energy from rotation of the main gear.

In some embodiments, the regenerative speed bump further incudes a spring configured to return the plunger to an original position after the motion of the plunger along the axis of rotation.

In some embodiments, a top of the plunger is mechanically connected to an inner surface of the sloped cover portion.

According to a second aspect of the disclosure, a method of energy regeneration is disclosed. The method includes regenerating energy with a regenerative speed bump, which is installed on a road, from a passing vehicle. The regenerative speed bump includes a flat base portion and a sloped cover portion. The flat base portion and the sloped cover portion form a cavity enclosed in the regenerative speed bump. The sloped cover portion is flexible and configured to deflect downward upon application of force. The regenerative speed bump further includes a regenerative energy mechanism that is housed in the cavity of the regenerative speed bump and includes a main near having an axis of rotation and including an inner ring of ratchets. The regenerative energy mechanism further includes a plunger positioned along the axis of rotation and configured to rotate the main gear by motion of the plunger along the axis of rotation. The regenerative energy mechanism further includes a pawl configured to allow the inner ring of ratchets and the main gear to rotate in only one direction. The plunger is mechanically connected to the sloped cover portion such that the plunger moves down along the axis when the sloped cover portion deflects downward.

In some embodiments, the method further includes moving the plunger down along the axis by the passing vehicle, rotating the main gear as a result of the moving of the plunger down, and rotating at least one gear of a generator to regenerate the energy. The at least one gear of the generator is connected to the main gear.

In some embodiments, the plunger includes a spiral portion in contact with the main gear during the motion of the plunger along the axis of rotation.

In some embodiments, the main gear further includes a central nut in contact with the spiral portion of the plunger during the motion of the plunger along the axis of rotation.

In some embodiments, the central nut includes at least one slot through which the plunger extends.

In some embodiments, the at least one slot is rectangular.

In some embodiments, the plunger is configured to rotate the main gear by a spinning top mechanism.

In some embodiments, the method further includes returning the plunger to an original position by a spring after the motion of the plunger along the axis of rotation.

In some embodiments, a top of the plunger is mechanically connected to an inner surface of the sloped cover portion.

In some embodiments, the main gear is fixed at a certain height above the road.

In some embodiments, the method further includes installing the regenerative speed bump on the road such that the axis of rotation is perpendicular to the road.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
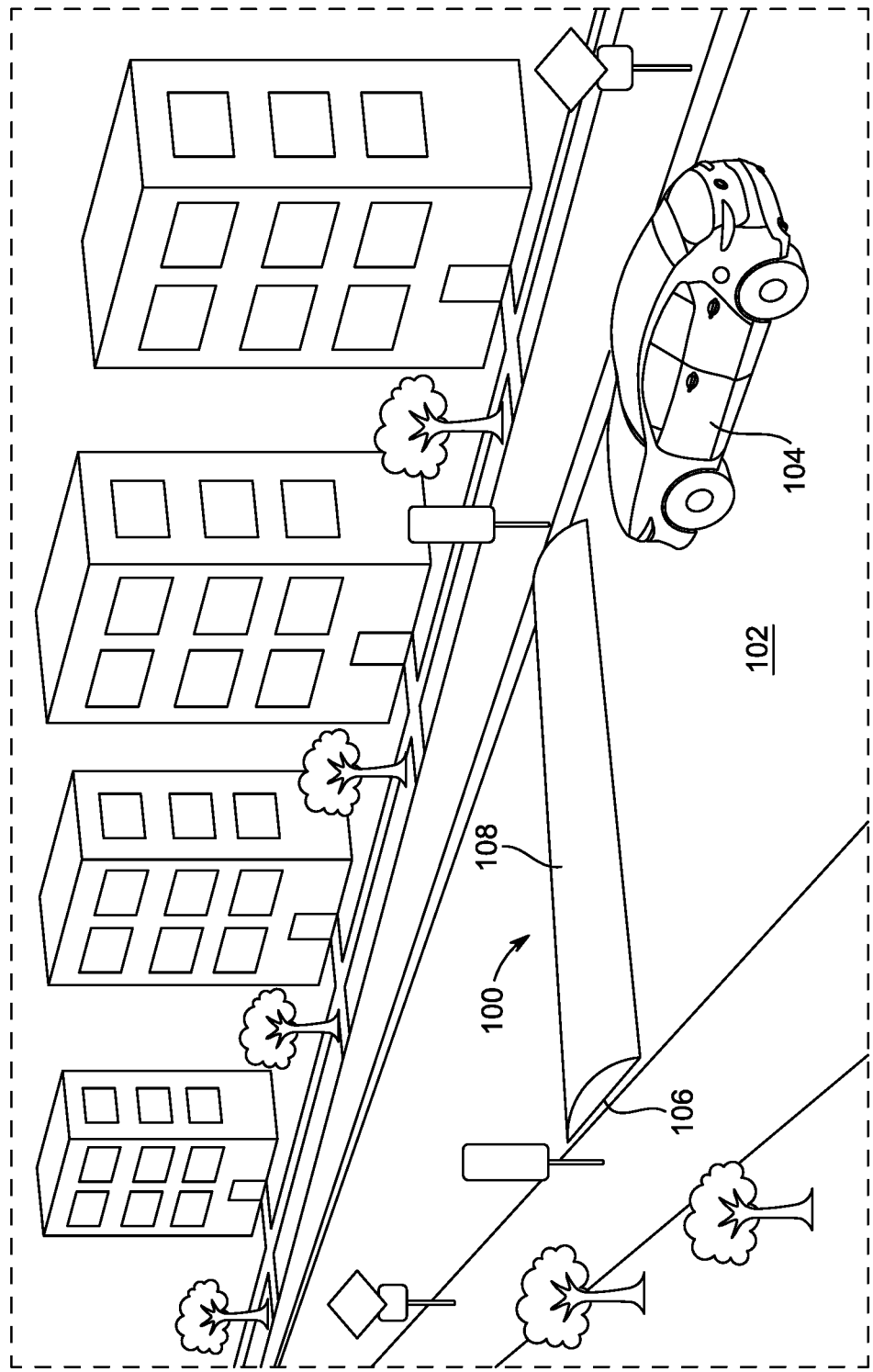
FIG. 1 is a schematic perspective view of an exemplary residential layout showing a regenerative speed bump implemented on a road, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a regenerative speed bump and a method for regenerating energy using the regenerative speed bump. The method of the present disclosure uses a spinning top mechanism to convert translational motion of a sloped cover portion of the regenerative speed bump to rotational motion of a main gear to help produce electrical energy. Particularly, with the spinning top mechanism, the main gear of a regenerative energy mechanism of the regenerative speed bump rotates when a vehicle passes over the regenerative speed bump. The rotational motion of the main gear may be transferred to a gear of a generator which in return produces electrical energy that can be stored in batteries or used for other purposes.

Referring to FIG. 1, a schematic perspective view of an exemplary residential layout showing a regenerative speed blimp 100 implemented on a road 102 is illustrated, according to an embodiment of the present disclosure. Generally, the regenerative speed bump 100 is implemented on the road 102 near residential areas or construction sites to reduce speed of a passing vehicle 104, which would be otherwise hazardous to a driver of the passing vehicle 104 and the surroundings. According to the present disclosure, the regenerative speed bump 100 is implemented on the road 102 such that the regenerative speed bump 100 can generate electrical energy from kinetic energy of the passing vehicles 104. The regenerative speed bump 100 includes a flat base portion 106 and a sloped cover portion 108. In some embodiments, the flat base portion 106 may be disposed on a surface of the road 102 and a main gear (e.g., 214 in FIG. 2) may be fixed at a certain height above the road 102. In some embodiments, the flat base portion 106 may be disposed below the surface of the road 102 by a desired height such that the sloped cover portion 108 may be aligned with the surface of the road 102.

Figure 2:
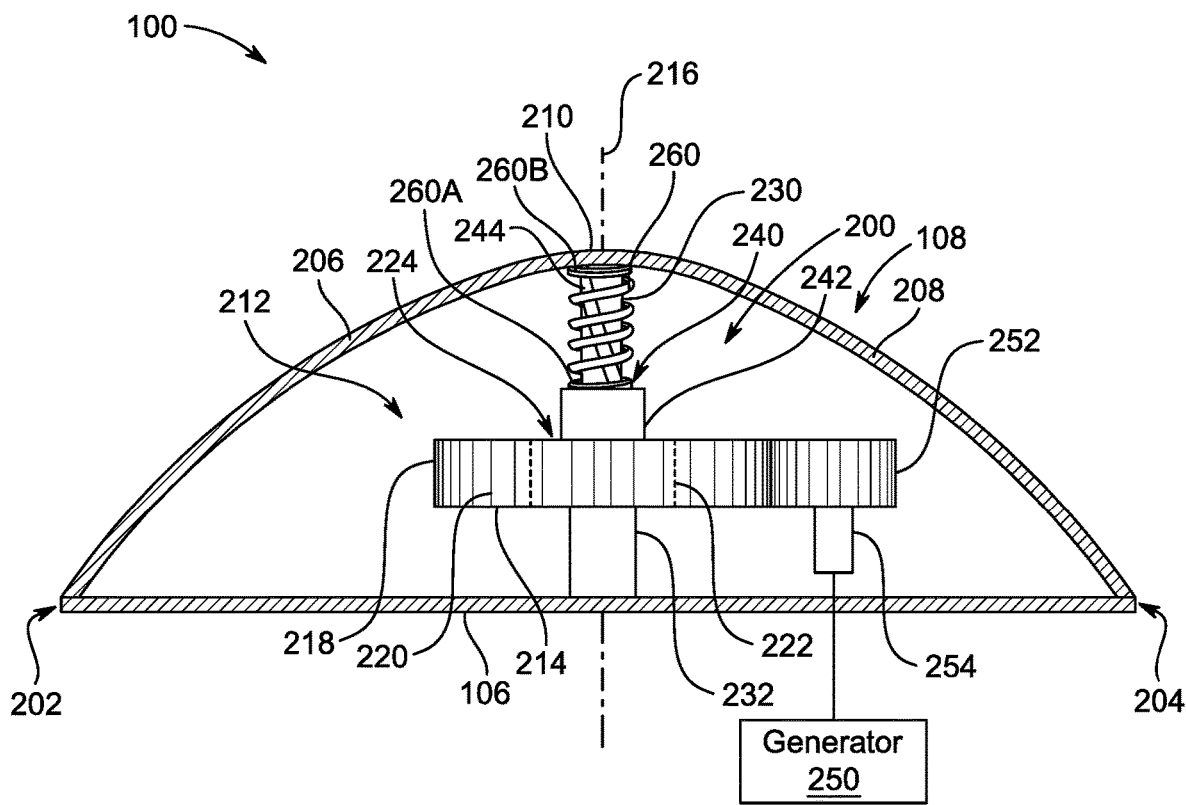
FIG. 2 is a schematic side view of the regenerative speed bump showing a regenerative energy mechanism, according to certain embodiments.

Referring to FIG. 2, a schematic side view of the regenerative speed bump 100 having a regenerative energy mechanism 200 is illustrated, according to an embodiment of the present disclosure. The flat base portion 106 includes a first end 202 and a second end 204 defining a length. In some embodiments, the flat base portion 106 may be made of a metal or a metal alloy having high heat resistant and corrosion resistant properties. In some embodiments, the flat base portion 105 may be made of polymer materials. The sloped coyer portion 108 is disposed over the flat base portion 106 and includes a first slanting portion 206 extending from the first end 202 of the flat base portion 106, a second slanting portion 208 extending from the second end 204 of the flat base portion 106 towards the first slanting portion 206, and an apex portion 210 connecting the first slanting portion 206 and the second slanting portion 208. The first slanting portion 206, the second slanting portion 208, and the apex portion 210 may be together configured to define a cross-sectional shape such as, but not limited to, an arc shape, a hemi-circle shape, and a rounded corner triangle shape. Further, the cross-sectional shape of the sloped cover portion 108 may be defined based on statutory requirements. The sloped cover portion 108 is flexible and configured to deflect downward upon application of a force. Particularly, the sloped cover portion 108 may be made of flexible materials such as, but not limited to, elastomers such that the sloped cover portion 108 may move downward while the vehicles pass over the regenerative speed bump 100. In some embodiments the first slanting portion 206 and the second slanting portion 208 are only partially flexible, preferably flexing only at a top portion near the apex portion 210 of the sloped cover portion 108 and more preferably downwardly flexible only to the extent of a distance of travel of a plunger 230 when fully depressed.

The fiat base portion 106 and the sloped cover portion 108 are together configured to form a cavity 212 enclosed in the regenerative speed bump 100. A regenerative energy mechanism 200 is housed in the cavity 212 of the regenerative speed bump 100. The regenerative energy mechanism 200 is disposed within the cavity 212 in such a way to convert kinetic energy of the passing vehicles 104 into electrical energy. The cavity 212 may enclose a filler material such as a matrix that surrounds the sides and/or bottom portions of the regenerative energy mechanism 200. The matrix may be used to help prevent too much downward flexing that may otherwise damage the regenerative energy mechanism 200, e.g., downward flexing of the sloped cover portion 108 that forces the sloped cover portion 108 into contact with the regenerative energy mechanism 200.

The regenerative energy mechanism 200 includes a main gear 214 having an axis of rotation 216. The main gear 214 is disposed parallel to the flat base portion 106 and the axis of rotation 216 thereof is defined perpendicular to the flat base portion 106. Further, the axis of rotation 216 of the main gear 214 may be defined along a central axis of the regenerative speed bump 100 passing through a center of the apex portion 210 of the sloped cover portion 108. The main gear 214 includes an outer circumference 218 having a plurality of teeth 220 and an inner circumference 222 defining an opening 224. Further, the outer circumference 218 of the main gear 214 defines an outer diameter and the inner circumference 222 defining an inner diameter.

The regenerative energy mechanism 200 further includes the plunger 230 positioned along the axis of rotation 216 and configured to rotate the main gear 214 by motion of the plunger 230 along the axis of rotation 216. The plunger 230 includes a top end configured to couple with the apex portion 210 of the sloped cover portion 108 and a bottom end slidably coupled to a sleeve 232. Particularly, the top end, or a top, of the plunger 230 is mechanically connected to an inner surface of the sloped cover portion 108 such that the plunger 230 moves down along the axis of rotation 216 when the sloped cover portion 108 deflects downward. The sleeve 232 may be detachably coupled to the flat base portion 106 to facilitate vertical movement of the plunger 230. Further, the sleeve 232 may rotatably support the main gear 214 using known connecting methods. The plunger 230 passes through the opening 224 defined by the inner circumference 222 of the main gear 214 and configured to rotate the main gear 214 upon deflection of the sloped cover portion 108 downward.

In some embodiments the regenerative energy mechanism 200 is housed in the cavity 212 of the regenerative speed bump 100 such that portions of the regenerative energy mechanism 200 are disposed outside the cavity 212 defined by the flat base portion 106 and the sloped cover portion 108. For example, the plunger 230 may be disposed partially outside the cavity 212 such that the plunger 230 has a length of travel which extends beyond the flat base portion 106.

Similarly, the main gear 214 may be partially or fully disposed outside the cavity 212 together with a generator 250.

In some embodiments, the main gear 214 includes a central nut 240 disposed within the opening 224 thereof. The central nut 240 includes a hub 242 configured to receive the plunger 230 therethrough. Particularly, the plunger 230 includes a spiral portion 244 configured to engage with the hub 242 of the central nut 240. As such, the plunger 230 is in contact with the main gear 214 during the motion of the plunger 230 along the axis of rotation 216.

The regenerative speed bump 100 further includes the generator 250 configured to generate electrical energy from the kinetic energy received from the passing vehicles 104 via the regenerative energy mechanism 200. In particular, the generator 250 includes at least one gear 252, alternatively referred to as 'the high-speed gear 252', connected to the main gear 214 so that the generator 250 generates the electrical energy using the rotational movement of the main gear 214. In some embodiments the generator 250 includes a high-speed shaft 254 coupled to the high-speed gear 252 which is in turn operably engaged with the main gear 214. The high-speed gear 252 has an outer diameter smaller than the outer diameter of the main gear 214 such that a single rotation of the main gear 214 causes multiple rotations of the high-speed gear 252 based on a ratio of the outer diameters of the main gear 214 and the high-speed gear 252.

The regenerative speed bump 100 further includes a spring 260 configured to return the plunger 230 to an original position after the motion of the plunger 230 along the axis of rotation 216 of the main gear 214. The original position of the plunger 230 may correspond to a normal position of the sloped cover portion 108 in the absence of the passing vehicle 104. In an embodiment, the spring 260 may be a compression spring. The spring 260 is received over the plunger 230 and includes a first end 260A disposed on the hub 242 of the central nut 240 and a second end 260B disposed on an inner surface of the apex portion 210 of the sloped cover portion 108. During the movement of the vehicle 104 over the sloped cover portion 108, a force may be applied on the apex portion 210 of the sloped cover portion 108 which may cause the sloped cover portion 108 and the plunger 230 to move downward along the axis of rotation 216 of the main gear 214. Such downward movement of the sloped cover portion 108 and the plunger 230 along the axis of rotation 216 causes compression of the spring 260. A spring force generated due to the compression of the spring 260 helps the plunger 230 to return to the original position thereof when the force is removed from the sloped cover portion 108.

Figure 3:
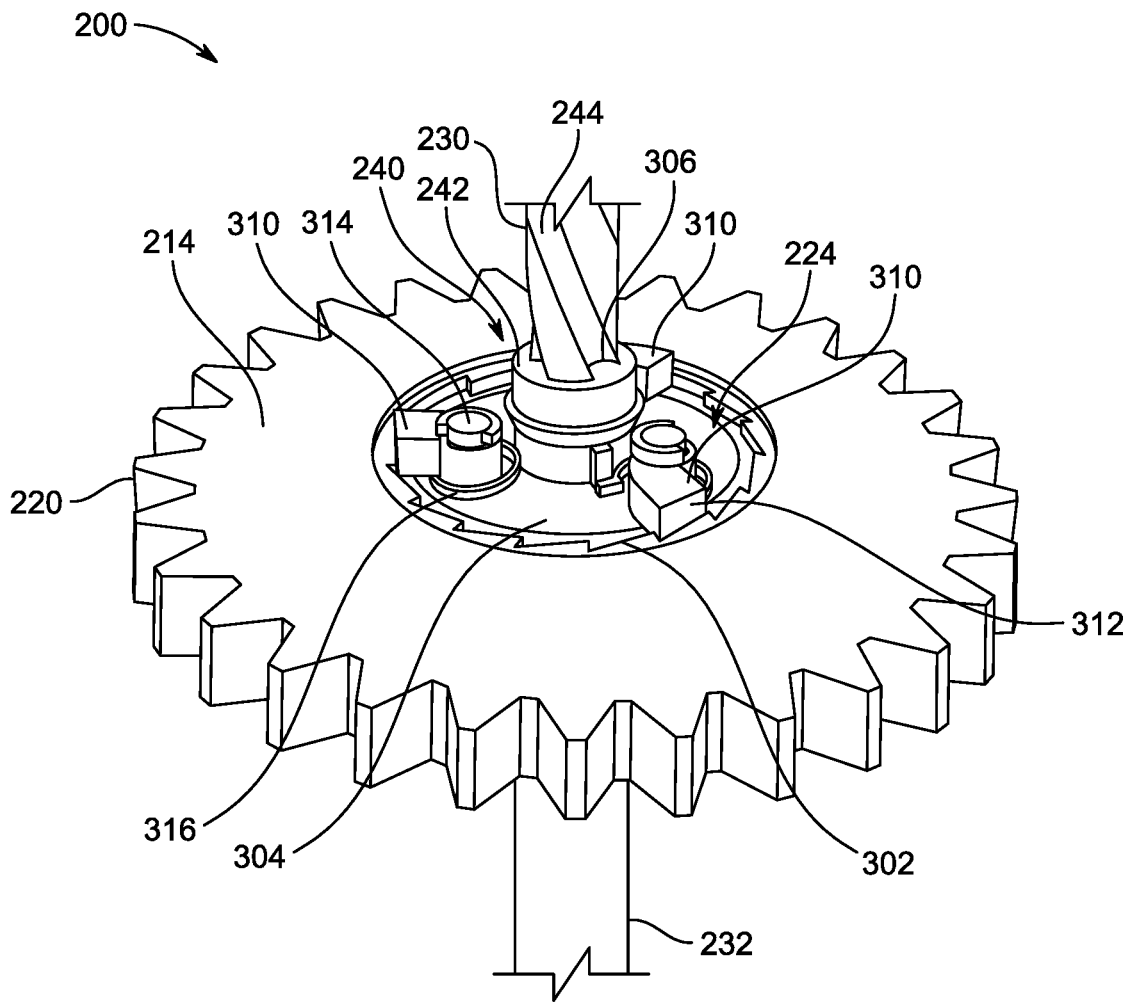
FIG. 3 is a schematic perspective, view of the regenerative energy mechanism of FIG. 2, according to certain embodiments.

Referring to FIG. 3, a schematic perspective view of the regenerative energy mechanism 200 is illustrated, according to an embodiment of the present disclosure. The regenerative energy mechanism 200 includes the main gear 214, the plunger 230, and the central nut 240 together configured to covert linear movement of the plunger 230 into rotational movement of the main gear 214. The main gear 214 includes an inner ring of ratchets 302 disposed on the inner circumference 222 thereof. In one embodiment, the inner ring of ratchets 302 may be an individual component detachably attached to the inner circumference 222 of the main gear 214 using fastening members. In another embodiment, the inner ring of ratchets 302 may be an integral design of the main gear 214 defined on the inner circumference 222 thereof.

The central nut 240 includes the hub 242 and a flange 304 radially extending away from the hub 242 like a circular body. The flange 304 has a thickness less than a thickness of the main gear 214. In one example, the thickness of the flange 304 may be half of the thickness of the main gear 214. Further, the flange 304 has an outer diameter larger than an inner diameter defined by the inner ring of ratchets 302. As such, the central nut 240 is conveniently received within the opening 224 of the main gear 214. In some embodiments, a plurality of radially extending protrusions may be provided around the hub 242 instead of the flange 304 to accommodate within the opening 224 of the main gear 214. The central nut 240 further includes at least one slot 306 through which the plunger 230 extends to cause rotational movement of the main gear 214 during the downward movement of the plunger 230. Particularly, the hub 242 of the central nut 240 includes a central opening configured to receive the plunger 230 therethrough. An inner circumference of the central opening includes the at least one slot 306 to engage with the spiral portion 244 of the plunger 230. In some embodiments, the inner circumference of the central opening of the hub 242 may include a plurality of slots 306 corresponding to a plurality of spiral portions 244 defined on the plunger 230 such that the plunger 230 is movably engaged with the hub 242 of the central nut 240. In other words, a cross-sectional shape of the hub 242 is defined in conformance with a cross-sectional shape of the plunger 230 defined by the spiral portion 244 such that the linear movement of the plunger 230 causes rotational movement of the main gear 214. In some embodiments, the slot 306 is rectangular to engage with the spiral portion 244 of the plunger 230. In such a case, a cross-section of the spiral portion 244 may also be a rectangular shape to snuggly engage with the slot 306 of the central nut 240. In some embodiments, a cross-sectional shape of the slot 306 may be a square, a hemi-circle, a triangle, a trapezoid, or any other polygon shape known in the art. A cross-sectional shape of the spiral portion 244 may be defined corresponding to the cross-sectional shape of the slot 306.

The regenerative energy mechanism 200 further includes one or more pawls 310 configured to allow the inner ring of ratchets 302 and the main gear 214 to rotate in one direction. According to the present disclosure, the regenerative energy mechanism 200 includes three pawls 310. In some embodiments, the regenerative energy mechanism 200 may include one pawl 310. The pawl 310 includes a first end having a contact surface 312a configured to engage with a tooth of the inner ring of ratchets 302 and a second end configured to pivotally engage with the central nut 240. Particularly, the second end of the pawl 310 is rotatably coupled to a pivot pin 314 which is in turn connected to the flange 304 of the central nut 240. During the operation of the regenerative energy mechanism 200, the pawl 310 may rotate about a central axis of the pivot pin 314. A torsional spring 316 is attached between the pawl 310 and the flange 304 to hold the pawl 310 against a biasing force of the torsional spring 316 such that the contact surface 312 of the pawl 310 is always engaged with a tooth of the inner ring of ratchets 302. As such, the central nut 240 of the main gear 214 is in contact with the spiral portion 244 of the plunger 230 and the inner ring of ratchets 302 during the motion of the plunger 230 along the axis of rotation 216. Thus, with the construction of the main gear 214 with the inner ring of ratchets 302, the central nut 240 with the huh 242, and the pawl 310, the plunger 230 is configured to rotate the main gear 214 by a spinning top mechanism. Generally, the spinning top mechanism is defined as a working principle in which a potential energy of the top is converted into a kinetic energy due to a torque applied on the top. Similarly, according to the present disclosure, when the force is applied on the sloped cover portion 108 by the passing vehicles 104, the plunger 230 moves down along the axis of rotation 216 and applies a torque on the central nut 240 which in turn applies a torque on the main gear 214 as the central nut 240 is connected to the main gear 214 through the pawl 310 and the inner ring of ratchets 302. The torque applied on the main gear 214 converts the potential energy of the plunger 230 into kinetic energy of the main gear 214, which thus rotates in a clockwise direction.

Figure 4:
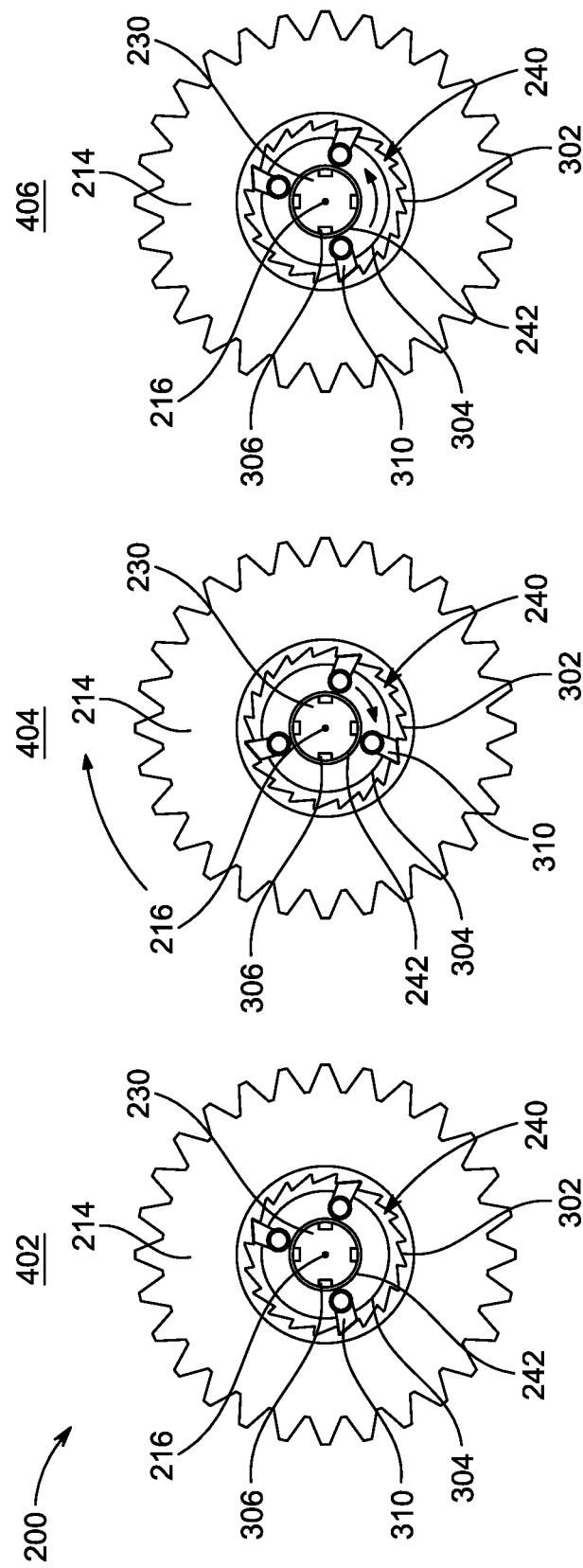
FIG. 4 illustrates working of the regenerative speed bump based on a top spinning mechanism, according to certain embodiments.

Referring to FIG. 4, working of the regenerative speed bump 100 based on the top spinning mechanism is illustrated with reference to a schematic top view of the regenerative energy mechanism 200, according to an embodiment of the present disclosure. At step 402, the plunger 230 is in the original position, which means no force is applied on the sloped cover portion 108 by the passing vehicle 104. Further, the contact surfaces 312 of the pawls 310 can be in firm contact with the teeth of the inner ring of ratchets 302 such that the central nut 240 is firmly engaged with the main gear 214. As such, the plunger 230 is in contact with the main gear 214 and configured to cause rotational movement thereof upon downward movement of the plunger 230 along the axis of rotation 216.

At step 404, the passing vehicle 104 apply the force on the apex portion 210 of the sloped cover portion 108 which moves the plunger 230 downward along the axis of rotation 216 of the main gear 214. The downward movement of the plunger 230 causes the spring 260 to compress as the spring force is lesser than the force applied by the passing vehicle 104. As the spiral portion 244 of the plunger 230 is in contact with the slot 306 provided in the hub 242 of the central nut 240, the central nut 240 rotates in a clockwise direction which in turn rotates the main gear 214 in the clockwise direction as the contact surfaces 312 of the pawls 310 are in firm contact with the teeth of the inner ring of ratchets 302. The main gear 214 may rotate for an angle of 360 degrees, more than 360 degrees or less than 360 degrees. The angle of rotation of the main rear 214 may be defined based on an angle of inclination of the spiral portion 244 of the plunger 230 with respect to a central axis of the plunger 230. Further, a rotational speed of the main gear 214 may also be defined based on the angle of inclination of the spiral portion 244 of the plunger 230.

At step 406, the force applied by the passing vehicle 104 is removed from the sloped cover portion 108. As the force is removed from the plunger 230, the spring force of the spring 260 causes movement of the plunger 230 to the original position thereof. As the spiral portion 244 of the plunger 230 is in contact with the slot 306 provided in the hub 242 of the central nut 240, the central nut 240 moves in an anticlockwise direction. During the movement of the central nut 240 in the anticlockwise direction, the pawls 310 are disengaged from the teeth of the inner ring of ratchets 302 and thereby allow rotation of the central nut 240 in the anticlockwise direction while the main gear 214 is stationary. Particularly, the pawls 310 deflect against the biasing force of the torsional spring 316 and move along a profile of the teeth of the inner ring of ratchets 302 during the rotation of the central nut 240 in the anticlockwise. Upon removal of the force, the plunger 230 goes to the original position thereof and the pawls 310 firmly engage with the teeth of the inner ring of ratchets 302 as explained in the step 402. The step 404 is further repeated upon application of the force by the passing vehicle 104. As such, the cyclic operation of the regenerative speed bump 100 continues, and the main gear 214 continues to rotate in the clockwise direction to generate electricity with the help of the generator 250.

Figure 5:
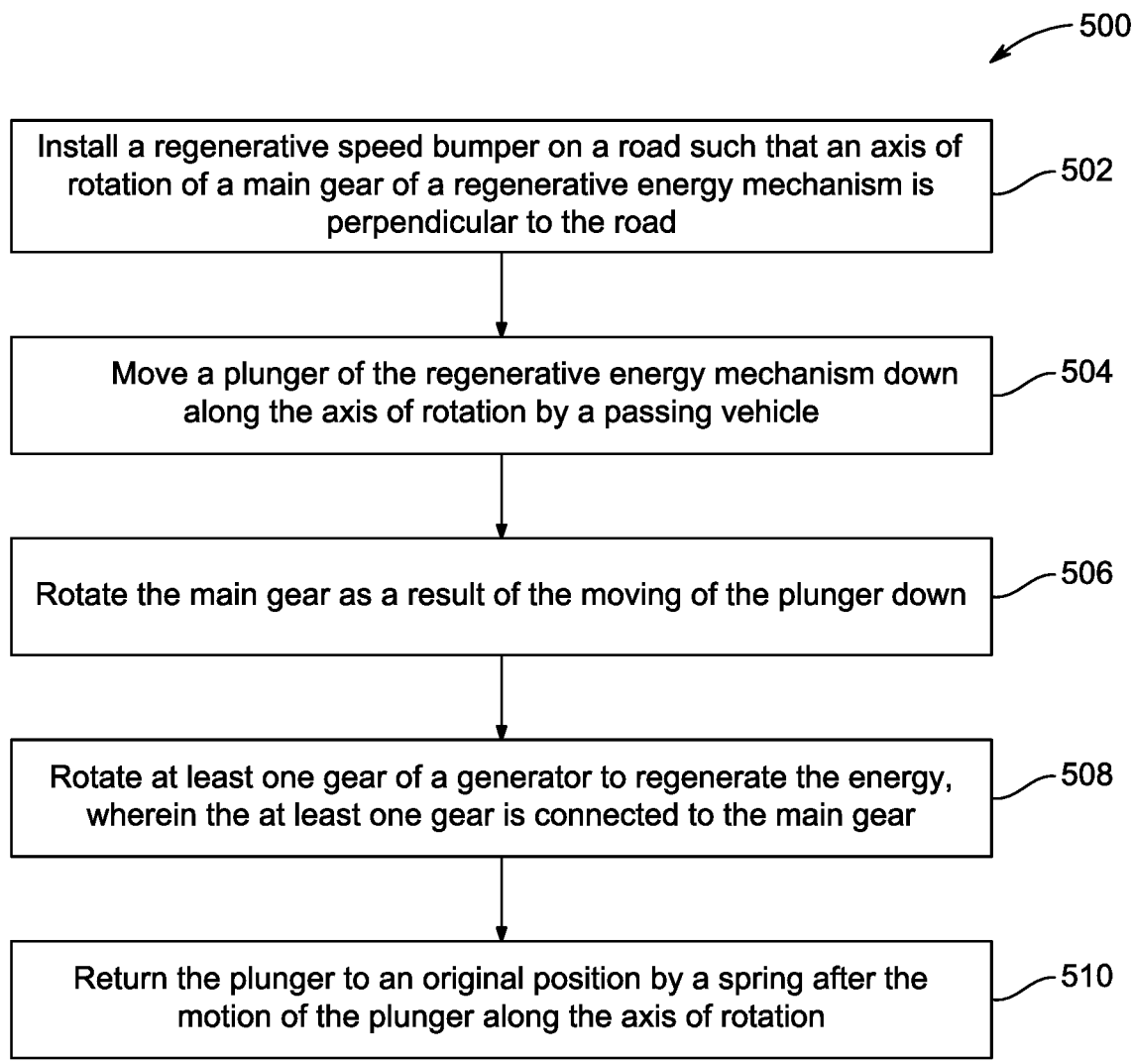
FIG. 5 is an exemplary flowchart of a method of energy regeneration using the regenerative speed bump, according to certain embodiments.

Referring to FIG. 5, a method 500 of energy regeneration using the regenerative speed bump 100 is illustrated, according to an embodiment of the present disclosure. The order in which the method 500 is described is not intended to be construed as a limitation, and any number of the described method steps may be combined in any order to implement the method 500. Additionally, individual steps may be removed or skipped from the method 500 without departing from the spirit and scope of the present disclosure. The method 500 of the present disclosure is illustrated with refence to the regenerative speed bump 100 shown in FIG. 2 and FIG. 3.

At step 502, the method 500 includes installing the regenerative speed bump 100 on the road 102 such that the axis of rotation 216 of the main gear 214 of the regenerative energy mechanism 200 is perpendicular to the surface of the road 102. The regenerative speed bump 100 includes the flat base portion 106 disposed on the surface of the road 102 and the sloped cover portion 108 disposed over the flat base portion 106. The first slanting portion 206, the second slanting portion 208, and the apex portion 210 of the sloped cover portion 108 and the flat base portion 106 together define the cavity 212 to house the regenerative energy mechanism 200. The regenerative energy mechanism 200 includes the main gear 214, having the axis of rotation 216, disposed parallel to the flat base portion 106 and the axis of rotation 216 is defined perpendicular to the surface of the road 102. In some embodiments, the main gear 214 is fixed at the certain height above the road 102.

At step 504, the method 500 includes moving the plunger 230 of the regenerative energy mechanism 200 down along the axis of rotation 216 by the passing vehicle 104. The plunger 230 is positioned along the axis of rotation 216 and the top end is coupled with the apex portion 210 of the sloped cover portion 108 and the bottom end is slidably coupled to the sleeve 232. Particularly, the top of the plunger 230 is mechanically connected to the inner surface of the sloped cover portion 108 such that the plunger 230 moves down along the axis of rotation 216 when the sloped cover portion 108 deflects downward. Further, the plunger 230 passes through the opening 224 defined by the inner circumference 222 of the main gear 214 and rotates the main gear 214 upon deflection of the sloped cover portion 108 downward. Particularly, the main gear 214 includes the central nut 240 disposed within the opening 224 thereof. The central nut 240 includes the hub 242 to receive the plunger 230 therethrough. The plunger 230 includes the spiral portion 244 to engage with the hub 242 of the central nut 240. Thus, the plunger 230 is in contact with the main gear 214 during the motion of the plunger 230 along the axis of rotation 216.

At step 506, the method 500 includes rotating the main gear 214 as a result of the moving of the plunger 230 down. The main gear 214 includes the inner ring of ratchets 302 disposed on the inner circumference 222 thereof. The central nut 240 having the huh 242 and the flange 304 is conveniently received within the opening 224 of the main gear 214. The central nut 240 further includes the slot 306 through which the plunger 230 extends to cause rotational movement of the main gear 214 during the downward movement of the plunger 230. Particularly, the inner circumference of the central opening of the hub 242 includes the slot 306 to engage with the spiral portion 244 of the plunger 230. In some embodiments, the slot 306 is rectangular to engage with the spiral portion 244 of the plunger 230. The regenerative energy mechanism 200 includes the pawls 310 which allow the inner ring of ratchets 302 and the main gear 214 to rotate in only one direction. The pawl 310 has the contact surface 312 engages with the tooth of the inner ring of ratchets 302 and the second end is pivotally engaged with the central nut 240. The torsional spring 316 is attached between the pawl 310 and the flange 304 to hold the pawl 310 against the biasing force of the torsional spring 316 such that the contact surface 312 of the pawl 310 is always engaged with the tooth of the inner ring of ratchets 302. Thus, the central nut 240 of the main gear 214 is in contact with the spiral portion 244 of the plunger 230 and the inner ring of ratchets 302 during the motion of the plunger 230 along the axis of rotation 216. Thus, the main gear 214 with the inner ring of ratchets 302, the central nut 240 with the hub 242, the pawl 310, and the plunger 230 together help to rotate the main gear 214 by the spinning top mechanism.

At step 508, the method 500 includes rotating the gear 252 of the generator 250 to regenerate the energy. The gear 252 is connected to the main gear 214 so that the generator 250 generates the electrical energy using the rotational movement of the main gear 214. In some embodiments, the generator 250 includes the high-speed shaft 254 coupled to the gear 252 which is in turn operably engaged with the main gear 214. Due to the difference in the outer diameters of the gear 252 and the main gear 214, the single rotation of the main gear 214 causes multiple rotations of the gear 252 based on the ratio of the outer diameters of the main gear 214 and the gear 252.

At step 510, the method 500 includes returning the plunger 230 to the original position by the spring 260 after the motion of the plunger 230 along the axis of rotation 216. The spring 260 is received over the plunger 230 and the first end 260A is disposed on the hub 242 of the central nut 240 and the second end 260B is disposed on the inner surface of the sloped cover portion 108. During the movement of the vehicle 104 over the sloped cover portion 108, the force applied on the sloped cover portion 108 causes the plunger 230 to move downward along the axis of rotation 216. Such downward movement of the sloped cover portion 108 causes compression of the spring 260. The spring force generated due to the compression of the spring 260 helps the plunger 230 to return to the original position thereof when the force is removed from the sloped cover portion 108.

Accordingly, the method 500 of the present disclosure regenerates energy with the regenerative speed bump 100 installed on the road 102 from the passing vehicle 104. According to the present disclosure, the regenerative speed bump 100 converts translational motion into rotational motion using the spinning top mechanism which reduces the size thereof while maximizing energy production for auxiliary work. Continuous production of the electrical energy throughout the day helps to power light emitting diode (LED) warning lights at night on road construction sites. As the design of the regenerative speed bump 100 is circular, more than one generator 250 can be attached to the (single) main gear 214 while multiple main gears 214 can be attached to a single regenerative speed bump (e.g., 100) at different locations, thus increasing energy production. Further, the regenerative speed bump 100 helps to reduce cost of the energy. As the regenerative speed bumps 100 are portable, they can be used for more than one application. According to the present disclosure, the method 500 of generating electricity is efficient and has high manufacturability and practicability due to smaller size of the regenerative speed bump 100 compared to the conventional methods.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A regenerative speed bump, comprising:
 a flat base portion;
 a sloped cover portion, wherein the fiat base portion and the sloped cover portion form a cavity enclosed in the regenerative speed bump, and the sloped cover portion is flexible and configured to deflect downward upon application of force; and
 a regenerative energy mechanism that is housed in the cavity of the regenerative speed bump and comprises:
  a main gear having an axis of rotation and comprising an inner ring of ratchets,
  a plunger positioned along the axis of rotation and configured to rotate the main gear by motion of the plunger along the axis of rotation, and
  a pawl configured to allow the inner ring of ratchets and the main gear to rotate in only one direction,
 wherein the plunger is mechanically connected to the sloped cover portion such that the plunger moves down along the axis when the sloped cover portion deflects downward.

2. The regenerative speed bump of claim 1, wherein the plunger comprises a spiral portion contact with the main gear during the motion of the plunger along the axis of rotation.

3. The regenerative speed bump of claim 2, wherein the main gear further comprises a central nut in contact with the spiral portion of the plunger during the motion of the plunger along the axis of rotation.

4. The regenerative speed bump of claim 3, wherein the central nut includes at least one slot through which the plunger extends.

5. The regenerative speed bump of claim 4, wherein the at least one slot is rectangular.

6. The regenerative speed bump of claim 1, wherein the plunger is configured to rotate the main gear by a spinning top mechanism.

7. The regenerative speed bump bumper of claim 1, further comprising a generator including at least one gear connected to the main gear so that the generator is configured to generate energy from rotation of the main gear.

8. The regenerative speed bump of claim 1, further comprising a spring configured to return the plunger to original position after the motion of the plunger along the axis of rotation.

9. The regenerative speed bump of claim 1, wherein a top of the plunger is mechanically connected to an inner surface of the sloped cover portion.

10. A method of energy regeneration, the method comprising:
    regenerating energy with a regenerative speed bump, which is installed on a road, from a passing vehicle, wherein the regenerative speed bump bumper comprises:
        a flat base portion,
        sloped cover portion, wherein the flat base portion and the sloped cover portion form a cavity enclosed in the regenerative speed bump, and the sloped cover portion is flexible and configured to deflect downward upon application of force, and
        a regenerative energy mechanism that is housed in the cavity of the regenerative speed bump and comprises:
            a main gear having an axis of rotation and comprising an inner ring of ratchets,
            a plunger positioned along the axis and configured to rotate the main gear by motion of the plunger along the axis, and
            a pawl configured to allow the inner ring of ratchets and the main gear to rotate in only one direction,
        wherein the plunger is mechanically connected to the sloped cover portion such that the plunger moves down along the axis when the sloped cover portion deflects downward.

11. The method of claim 10, further comprising:
    moving the plunger down along the axis by the passing vehicle;
    rotating the main gear as a result of the moving of the plunger down; and
    rotating at least one gear of a generator to regenerate the energy, wherein the at least one gear of the generator is connected to the main gear.

12. The method of claim 10, wherein the plunger comprises a spiral portion in contact with the main gear during the motion of the plunger along the axis of rotation.

13. The method of claim 12, wherein the main gear further comprises a central ma in contact with the spiral portion of the plunger during the motion of the plunger along the axis of rotation.

14. The method of claim 13, wherein the central nut includes at least one slot through which the plunger extends.

15. The method of claim 14, wherein the at least one slot is rectangular.

16. The method of claim 10, wherein the plunger is configured to rotate the main gear by a spinning top mechanism.

17. The method of claim 10, further comprising returning the plunger to an original position by a spring after the motion of the plunger along the axis of rotation.

18. The method of claim 10, wherein a top of the plunger is mechanically connected to an inner surface of the sloped cover portion.

19. The method of claim 10, wherein the main gear is fixed at a certain height above the road.

20. The method of claim 10, further comprising installing the regenerative speed bump on the road such that the axis of rotation is perpendicular to the road.

* * * * *